United States Patent [19]
Stunkard

[11] 3,819,163
[45] June 25, 1974

[54] SELF CENTERING PIPE WORKING MACHINE

[75] Inventor: Gerald A. Stunkard, Jenks, Okla.

[73] Assignee: DND Corporation, Houston, Tex.

[22] Filed: Dec. 20, 1971

[21] Appl. No.: 209,592

Related U.S. Application Data

[63] Continuation of Ser. No. 874,759, Nov. 7, 1969, abandoned.

[52] U.S. Cl. .............. 266/23 NN, 82/4 C, 408/126
[51] Int. Cl............................................... B23k 7/04
[58] Field of Search........ 266/23 N, 23 NN; 82/4 C; 408/125, 126

[56] References Cited
UNITED STATES PATENTS

| | | | |
|---|---|---|---|
| 2,086,764 | 7/1937 | Brown.............................. | 266/23 N |
| 2,097,071 | 10/1937 | Lichten........................... | 74/215 X |
| 2,146,959 | 2/1939 | Kugel.............................. | 266/23 N |
| 2,364,963 | 12/1944 | Elliott............................. | 266/23 N |
| 2,542,846 | 2/1951 | Trombetta...................... | 266/23 B |
| 2,747,274 | 5/1956 | Willard et al. ................ | 82/4 C |

*Primary Examiner*—Leonidas Vlachos
*Attorney, Agent, or Firm*—Pravel, Wilson & Matthews

[57] ABSTRACT

A self centering pipe working machine has a circular frame portion positionable around a pipe section, an openable ring assembly in movable contact with the periphery of the frame portion, and a pair of self centering clamp members positioned on a clamping assembly which is further attached to said frame portion. Adjustable tool support means is removably attached to the openable ring member for rotative movement around a pipe section to be worked. In one embodiment, a driving means is attached to the frame with the driving means having a driven wheel in contact with the rotatable ring assembly in order to rotate the tool support means around the pipe section. In another embodiment of the invention, the driving means includes a driven sprocket member in contact with a chain-like member secured to the periphery of the openable ring assembly in order to drive the ring assembly. The clamping members move in opposite motion to each other slidably along a guide member by reason of having a threadable portion cooperating with oppositely threaded parts of a screw member parallel to the guide member.

14 Claims, 6 Drawing Figures

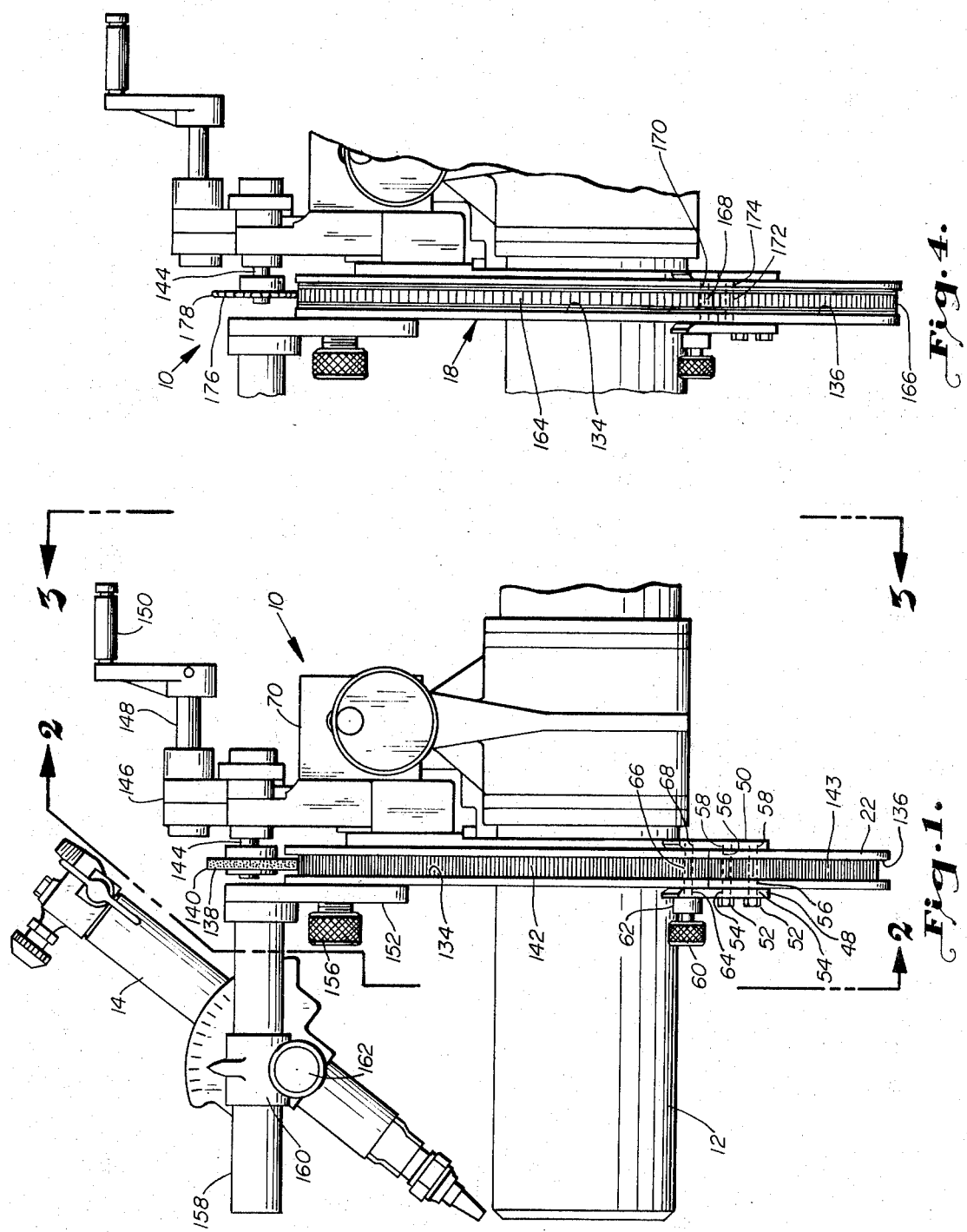

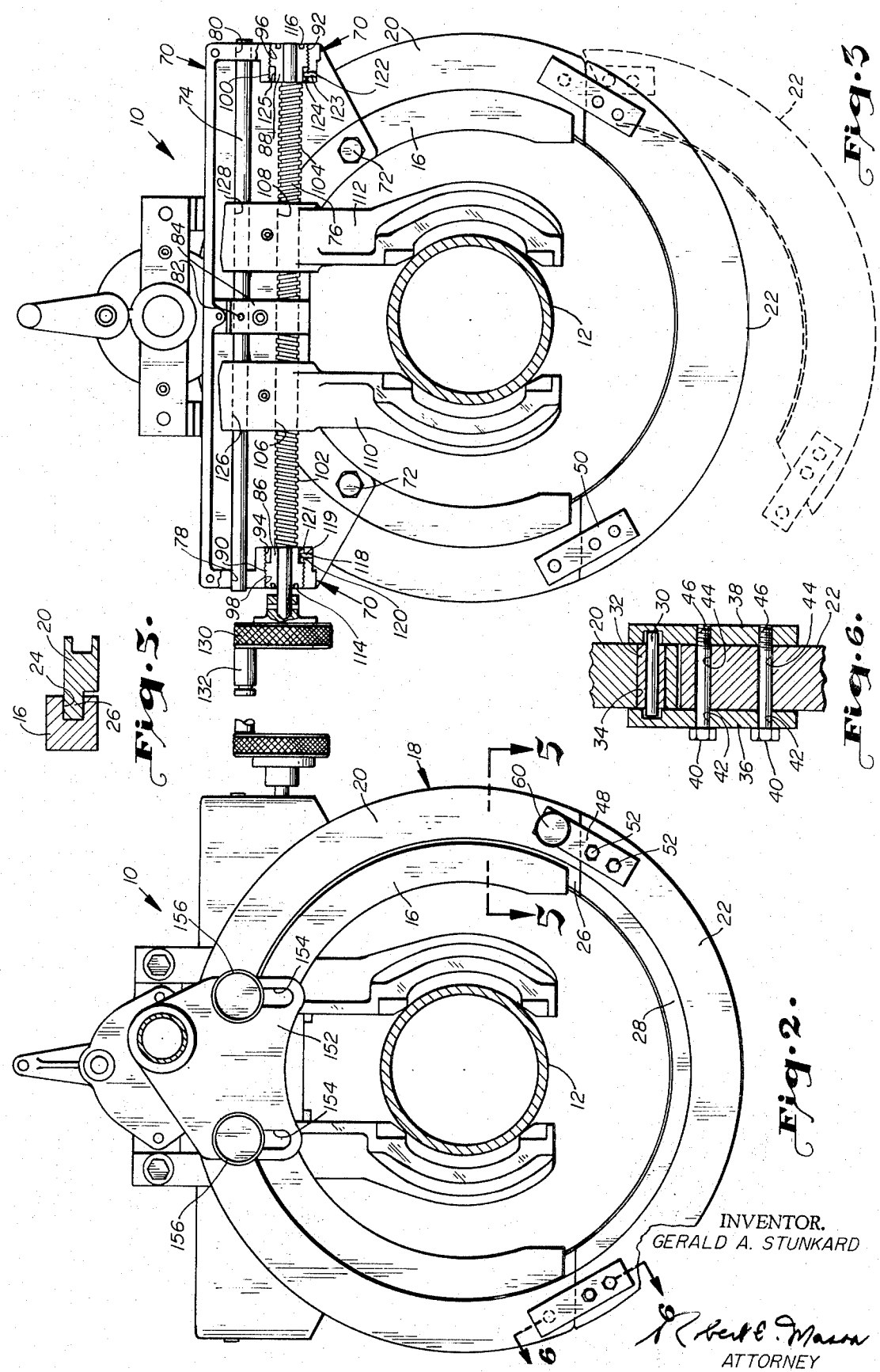

SELF CENTERING PIPE WORKING MACHINE

This is a continuation, of application Ser. No. 874,759 filed Nov. 7, 1969 and now abandoned.

BACKGROUND OF THE INVENTION

This invention relates to pipe working machines. More particularly, this invention relates to self centering pipe working machines, and still more particularly, to self centering pipe working machines usable for a variety of pipe working operations, such as cutting, beveling, welding, grinding, drilling, or x-raying.

Quite commonly, during pipe line operations, a pipe section must be "worked." That is, the pipe section must be cut to a desired length, or the end of a pipe section must be beveled to prepare it for a following welding operation, or the end of the pipe section must be specially treated as by grinding for some other special purpose. Pipe sections are usually provided in lengths of 40 feet and in diameters to 48 inches or more depending upon the type of service to which the pipe will be subjected. Because of the cumbersome size of the pipe section, and because it cannot be ascertained in advance what operation must be provided for each adjacent pipe section, the pipe working operations are generally carried on near the site where the pipe will be used. Therefore, it is desirable to have a pipe working apparatus which could be made portable and usable for either field or yard work, and which can be readily adaptable to the particular operation desired to effect considerable saving in time and labor.

A primary object of this invention is to provide a pipe working machine which is efficient in operation, easy to use, and inexpensive to manufacture.

Another object of this invention is to provide a pipe working apparatus which is readily adaptable to various sizes of pipe.

Still another object of this invention is to provide a pipe working apparatus which is capable of performing a multiplicity of operations.

Another object of this invention is to provide a self centering pipe working machine which is accurately positionable on a pipe.

Another object of this invention is to provide a self centering pipe working machine which may be easily and quickly positioned on a pipe.

Still another object of this invention is to provide a self centering pipe working machine which may be easily, quickly, and accurately positioned on a pipe section.

Still another object of this invention is to provide a pipe working machine which may be accurately and efficiently positioned on a pipe section and which is adaptable to receive various sizes of pipe.

Still another object of this invention is to provide a self centering pipe working machine adaptable to support a working tool for peripheral movement around a pipe.

Still another object of this invention is to provide a self centering pipe working machine which is adaptable for either manual or powered movement of a pipe working tool peripherally around a pipe.

BRIEF DESCRIPTION OF THE DRAWINGS

Further objects and advantages of the invention will become apparent from the following description and claims and from the accompanying drawings wherein:

FIG. 1 is a side elevational view of a pipe working machine according to this invention.

FIG. 2 is a front elevational view of a pipe working machine according to this invention along the lines 2—2 of FIG. 1.

FIG. 3 is a rear elevational view of a pipe working machine according to this invention along the lines 3—3 of FIG. 1.

FIG. 4 is a side elevational view of an alternate embodiment of a pipe working machine according to this invention similar to FIG. 1.

FIG. 5 is a sectional view along the lines 5—5 of FIG. 2.

FIG. 6 is a sectional view along the lines 6—6 of FIG. 2.

DESCRIPTION OF THE PREFERRED EMBODIMENTS

A self centering pipe working machine according to this invention comprises a circular frame, an openable ring assembly which is rotatable on the circular frame, self centering clamp means attached to the circular frame and clampable to a pipe section to be worked, tool support means connected to the ring assembly, and means for rotating the ring assembly on the frame.

An important feature of this invention is the capability of the clamp means to center the device accurately as the clamping members engage the surface of a pipe section so that the working tool, which may be a cutting torch, grinding or polishing member, or other desired tool, will be accurately positioned in relation to the portion of the pipe to be worked for orbital travel around the pipe. The clamping and centering operations of this machine are therefore easily and quickly accomplished.

Another important feature of this pipe working machine is the provision of an openable ring assembly in conjunction with the self centering capabilities of the clamp means.

The importance of these features can be best understood by reference to other devices which are known in the art. U.S. Pat. No. 2,146,959 to Kugel, issued Feb. 14, 1939, describes a pipe cutter which includes a plurality of pipe gripping members which position the pipe concentrically in relation to a central opening of the device. However, as stated by the patentee, the device is put into operation by being slipped over the end of the pipe and moved along to the point at which the operation is to take place, since the device is not adaptable to being opened for quick positioning directly around the position where the operation is to take place.

U.S. Pat. No. 2,086,764 to Brown, issued July 13, 1937, U.S. Pat. No. 2,364,963 to Elliott, issued Dec. 12, 1944, and U.S. Pat. No. 2,687,880 to Waterson, issued Aug. 31, 1954, each describe related apparatus having an openable ring assembly permitting the ring assembly to be positioned around a portion of a pipe section for carrying a working device around the periphery of the pipe section. However, in each of these cases, the ring assembly, and therefore the working device, is not self centering. In each of the foregoing instances, the means to adjust the ring assembly concentrically with regard to the pipe section is independently adjustable from the means to secure the apparatus to the pipe section.

Referring now to the drawings in detail, FIG. 1 describes a pipe working device 10, generally, according to this invention in position upon a section of pipe 12 as it would be in holding a working tool in position such as a cutting torch 14. A cutting torch 14 could be maintained in proper position for rotatable movement around the periphery of the pipe section 12 for cutting a section of pipe to a desired length or for preparing a beveled edge on the pipe section, or for presenting a smooth edge for the pipe section. Cutting torch 14 is shown in position for example only, and it is understood that other working tools may be so held in position, as for example a grinding tool, a drilling tool, or some other special tool adaptable for rotatable movement around the periphery of a pipe section. The pipe working device includes a frame member 16, essentially circular in conformation and comprising a portion of a circle, and a two-component openable ring member 18, generally, comprised of first ring portion 20 and second ring portion 22. Frame member 16 includes an annular groove 24 as shown in FIG. 5, and ring member 20 includes a tongue portion 26 adapted to move slidably and circumferentially in groove 24. Second ring portion 22 includes a tongue portion 28 which acts as a continuation of tongue 26 to move slidably in groove 24 as the openable ring 18 rotates around frame member 16 during operation of the device. Ring members 20 and 22 can be machined accurately so that they will abut each other precisely permitting tongue portions 26 and 28 to operate smoothly in groove 24.

FIG. 6 describes in detail how second ring portion 22 is hinged to first ring portion 20 by means of pin 30 positioned in bushing 32 which is placed in opening 34 in first ring portion 20, and hinge plates 36 and 38 which are secured to second ring portion 22 by means of machine bolts 40 which pass through openings 42 in hinge plate 36 and openings 44 in ring member 22, and are received threadably in threaded portions 46 of hinge plate 38. Second ring portion 22 is received lockably in position against first ring portion 20 by means of a locking device formed by plate members 48 and 50, machine bolts 52 which pass through openings 54 in plate member 48 and openings 56 in ring member 22 and are received threadably in openings 58 in plate member 50, and by operation of a threaded bolt member 60 which has a threaded portion received in interior threads of a nut member 62 fastened on plate 48, and which passes through opening 64 in plate 48 and opening 66 in ring member 20 and which is received threadably in opening 68 in plate member 50. Thus, with ring member 22 in position abutting ring member 20, bolt member 60 can be threaded into position to secure the alignment of ring members 20 and 22. However, bolt member 60 can take a variety of arrangements, and instead of being received threadably in opening 68, bolt member 60 could just as well pass through opening 68 and be received by a separate machine nut threadable thereon, or bolt member 60 may be in the form of a pin member which is spring biased through openings 64, 66, and 68. Release of bolt member 60 from its locking position thus permits ring portion 22 to swing open on its hinge portion in order to permit the entire ring assembly 18 to be positioned around a pipe section for clamping of the pipe working device thereon.

As shown most clearly in FIG. 3, a support frame 70, generally, is secured to frame member 16 as by means of machine bolt 72, in order to provide support for the clamping members of this pipe working device. Positioned upon support frame 70 is a guide bar 74 and a driving worm 76. Guide bar 74 has a smooth surface and is positioned in bores 78 and 80 and held in position by a conventional set screw 82 received threadably in support member 84. Driving worm 76 is received bearably in bearings 86 and 88 which have external threads 90 and 92 respectively, which cooperate with internal threads 94 and 96 in bores 98 and 100 of support frame 70. Bearings 86 and 88 also may be used as fine adjustments for the clamping device. Driving worm 76 has left hand threads 102 and right hand threads 104 thereon which cooperate with internal threads 106 and 108 respectively, of clamping members 110 and 112 in order to move clamping members 110 and 112 toward and away from each other in response to rotation of driving worm 76. Thus, to provide for precise centering adjustment of clamping members 110 and 112, which also permits accurate movement of the working tool as it rotates around the pipe section on ring member 18, bearings 86 and 88 may be moved in bores 98 and 100, thus causing slight lateral adjustment of driving worm 76 as desired. Bearings 86 and 88 may be readily positioned in bores 98 and 100 by provision of a suitable spanner wrench designed to fit depressions 114 and 116.

A threaded bore 118 is provided in support frame 70 which receives threadably Allen screw 119 having threads 120 permitting Allen screw 119 to act as a stop member to restrict undesired movement of bearing 86 by the force of Allen screw 119 against undercut surface 121 of bearing 86. A similar threaded bore 122 is provided for Allen screw 123 having threads 124 thereon and arranged to be positioned forcibly against undercut surface 125 of bearing 88 to restrict unwanted movement of bearing 88.

Clamping members 110 and 112 have bores 126 and 128 which receive slidably guide bar 74 which is substantially parallel to driving worm 76 and provides means to steady and to guide clamping members 110 and 112 in their movement along driving worm 76. Cranking means is provided to rotate driving worm 76 by means of driving wheel 130 secured to driving worm 76 and by cranking arm 132 on driving wheel 130. Although driving wheel 130 and cranking arm 132 provide for manual rotation of driving worm 76, it is contemplated that driving worm 76 could also be rotated by power means as by being connected to an electric or hydraulic motor.

As shown in FIG. 1, ring portions 20 and 22 are provided with grooves 134 and 136 respectively, which provide means to guide a driving wheel 138 having a peripheral surface of resilient material 140 along the lower surface of grooves 134 and 136 which, as in FIG. 1, may have knurled surfaces 142, 143, respectively in order to have one means of a friction drive for ring member 18. Resilient material 140 may be of rubber, nylon, teflon, or other similar material which is slightly resilient in order to provide a non-slipping driving means for the ring member. It is preferable to have a resilient surface rather than the cooperation of two hard metallic surfaces on ring member 18 and driving wheel 138, although metallic peripheries of ring 18 and wheel 138 could be utilized.

Driving wheel 138 is positioned on shaft 144 which is gearably connected to transmission assembly 146 which is further driven by rotation of shaft 148 and hand crank 150. Transmission assembly 146 may be of conventional design and may be of a suitable gear ratio between shaft 148 and shaft 144 as may be most suitable for the particular purpose of the working device. It is also contemplated that shaft 148 may be operably connected to a proper electric or hydraulic motor to provide the driving force. Transmission assembly 146 is secured to support frame 70 which, as stated above, is attached to frame member 16. Thus, the driving force applied to driving wheel 138 permits rotation of ring member 16 around the pipe section to which the pipe working device is clamped.

As shown in FIGS. 1 and 2, an adjustable tool support frame is attachable to ring member 18 and includes a support frame 152 having slots 154 therein which receive set screws 156 which further are received threadably in first ring portion 20. Attached to support frame 152 is a bar 158 upon which is adjustably positionable working tool clamp 160 which may be positioned longitudinally of bar 158 and secured angularly thereof by tightening of set screw 162 in clamp 160. FIG. 1 shows a conventional cutting torch held in position on clamp 160 although, as stated above, other types of working tools may be used.

FIG. 4 shows an alternate embodiment of a pipe working device according to this invention. In this embodiment a different means of driving ring assembly 18 is described. Instead of knurled surfaces 142 and 143 in grooves 134 and 136, a chain member 164 is positioned in groove 134 and a similar chain member 166 is positioned in groove 136. Chain member 164 is held in position by pin 168 passing through an end link of chain 164 and through bore 170 adjacent the extremity of rin portion 20. Chain 166 is held in position on ring portion 22 by means of pin 172 passing through an end link of chain 166 and further passing through bore 174 in ring portion 22. Similar means of fastening the chain members are provided for the other ends of chains 164 and 166. A sprocket 176 is secured to shaft 144 and has teeth 178 which engage the links of chains 164 and 166 to provide the driving means for ring member 18 of this embodiment. Chains 164 and 166 are so positioned on ring portion 20 and 22 that no lost motion occurs in the engaging of sprocket teeth 178 as they engage successively the individual chain portions 164 and 166.

In operation, threaded bolt member 60 is unscrewed to release second ring portion 22 from its position adjacent first ring portion 20, and therefore the ring assembly 18 is opened and the pipe working device is positioned transversely of a pipe section with clamping members 110 and 112 initially fully extended so that the pipe section may pass therebetween. Then, second ring portion 22 is brought into position adjacent ring portion 20 and threaded bolt member 60 is tightened securely. Thus, a continous smooth track or guiding surface is provided for the working tool which can be subsequently positioned on bar 158. With a pipe section brought between clamping members 110 and 112, cranking arm 132 is rotated causing clamping members 110 and 112 to approach the pipe section and ultimately to contact the pipe section and clamp thereon securely. Because of the precise adjustment capabilities of this working device, as the device is clamped on the pipe section, the pipe section is securely held concentrically in regard to the circumference of ring assembly 18. A working tool, such as cutting torch 14, may then be positioned adjustably as desired in clamp 160. Operation of hand crank 150 then causes rotation of driving wheel 138, and consequently rotation of ring member 18 with cutting torch 14 adjusted accurately, around the pipe section in a concentric manner.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A pipe-working machine comprising:
    an annular frame,
    an openable ring assembly rotatable on said frame,
    self-centering clamp means attached to said frame, said clamp means oppositely disposed on a screw member for inward and outward movement on said screw member in response to rotation of said screw member, said clamp means clampable to a pipe section to be worked,
    tool support means connected to said ring assembly, and
    driving means for rotating said ring assembly on said frame.

2. A pipe-working machine as described in claim 1, wherein:
    said clamp means includes a pair of clamp members oppositely disposed on said screw member for inward and outward movement on said screw member in response to rotation thereof, and wherein said clamp members are further slidably disposed on a guide member arranged parallel to said screw member.

3. A pipe-working machine as described in claim 2, wherein:
    said openable ring assembly is in tongue and groove relationship with the periphery of said frame and includes means to lock said ring assembly on said frame.

4. A pipe-working machine as described in claim 3, wherein:
    said openable ring assembly includes a chain-like member secured to the periphery thereof, and
    said driving means includes a gear assembly positioned on said frame, and said gear assembly further includes a sprocket cooperating with said chain-like member to drive said ring.

5. A pipe-working machine as described in claim 3, wherein:
    said openable ring is knurled around the periphery thereof, and
    said driving means includes a gear assembly positioned on said frame and said gear assembly further includes a wheel having a peripheral surface of resilient material positionable in driving contact with said ring.

6. A pipe-working machine as described in claim 4, wherein:
    said screw member includes adjustment means for adjustment of said screw member as desired.

7. A pipe-working machine as described in claim 5, wherein:
said screw member includes adjustment means for adjustment of said screw member as desired.

8. A pipe-working machine as described in claim 3, wherein:
said openable ring has a peripheral surface of resilient material, and
said driving means includes a gear assembly positioned on said frame and said gear assembly further includes a wheel having a knurled peripheral surface positionable in driving contact with said ring.

9. A pipe-working machine comprising:
an annular frame,
an openable ring assembly rotatable on said frame,
self-centering positioning means attached to said frame, said positioning means oppositely disposed on a screw member for inward and outward movement on said screw member in response to rotation of said screw member, said positioning means positionable on a pipe section,
tool support means connected to said ring assembly, and
driving means for rotating said ring assembly on said frame.

10. A pipe-working machine comprising:
an annular frame,
an openable ring assembly including peripheral surface means driveable to rotate said ring assembly on said frame,
self-centering positioning means attached to saif frame and having extending means for inward and outward movement to position said machine on a pipe section,
tool support means connected to said ring assembly, and
driving means including wheel means having peripheral surface means in driving contact with the peripheral surface means of said ring assembly for rotating said ring assembly on said frame,
one of said peripheral surface means comprising a knurled surface and the other of said peripheral surfaces being of resilient material.

11. A pipe-working machine as described in claim 10 wherein said extending means comprises clamp means oppositely disposed on screw member means for inward and outward movement in response to rotation of said screw member means.

12. The machine set forth in claim 1, wherein:
said clamp means has an unrestricted and unconnected lower opening, the width of which may be selected in response to the operation of said screw member for enabling the clamp means to be moved downwardly onto the pipe.

13. The machine set forth in claim 1, wherein:
said clamp mean includes a pair of clamp members mounted on said screw member; and
each of said clamp members having a clamping section adapted to engage a pipe, the lower portion of each section being separate from and unattached to the other section and adapted to be spaced apart a sufficient distance by the operation of said screw member for laterally moving said clamping sections over the pipe to be clamped.

14. The machine set forth in claim 13, including:
guide means slidably connected to each of said clamp members and disposed above said clamping sections for disposition on the same side of the pipe as said screw member for preventing locking of said clamping members without interfering with laterally moving said clamping sections over the pipe.

* * * * *